Patented Sept. 29, 1925.

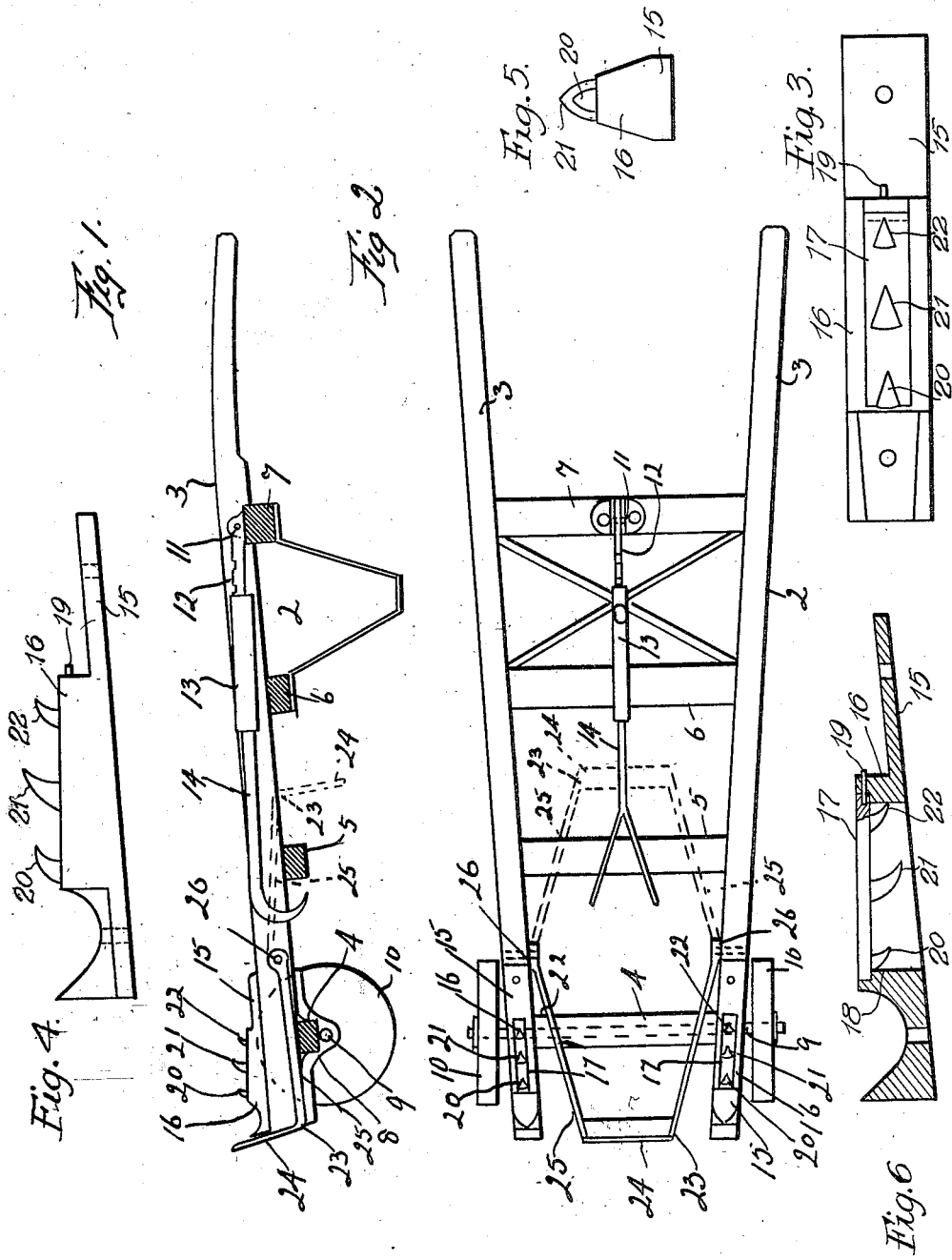

1,555,197

UNITED STATES PATENT OFFICE.

PETER C. FRITZ, OF PHILADELPHIA, PENNSYLVANIA.

HAND TRUCK.

Application filed August 21, 1923. Serial No. 658,533.

*To all whom it may concern:*

Be it known that I, PETER C. FRITZ, a citizen of the United States, residing at Philadelphia, in the county of Philadelphia and State of Pennsylvania, have invented new and useful Improvements in a Hand Truck, of which the following is a specification.

My invention relates to new and useful improvements in a hand truck, and has for its primary object to provide toe pieces of peculiar construction particularly adapted for proper engagement with portions of different articles, such as boxes and barrels whereby said articles may be readily and quickly handled.

A further object of this invention is to provide toe pieces having tangs of different heights whereby the longer ones may be engaged with articles especially those having a convex surface which under ordinary conditions would not be engaged by the shorter tangs.

A still further object of the invention is to provide a tang block formed integral with the tangs whereby the latter may be reversibly mounted in the toe pieces.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a longitudinal sectional view of a hand truck embodying my improvements.

Fig. 2, is a plan view thereof.

Fig. 3, is an enlarged view of one of the toe pieces with the tangs projecting outwardly.

Fig. 4, is a side elevation thereof.

Fig. 5, is an end view of the same.

Fig. 6, is a longitudinal sectional view of the toe piece showing the tangs reversed.

In carrying out my invention as here embodied, 2 represents a hand truck which is composed of the handle bars 3 connected by means of the cross pieces 4, 5, 6 and 7. To the underside of the handle at the forward end thereof are secured suitable hangers 8 in which is journalled the axle 9 having a wheel 10 journalled to each end thereof.

To the cross piece 7 is secured a bracket 11 to which is pivoted a ratchet bar 12 projecting into the casing 13 the latter housing a pawl whereby said casing is adjustable on the ratchet bar 12 as is fully described in my co-pending application referred to above.

The casing 13 carries a hook bar 14 which is adapted to engage articles to be placed upon the truck.

Upon each of the handle bars 3 at its forward end is secured a toe piece 15 including a housing 16 for the reception of the tang block 17 adapted to rest upon a shoulder within the housing in either of two positions as will be obvious and when the tang block is within the housing it may be held in place by suitable retaining means 19 such as a pin or its equivalent passing through a hole in the housing and registering with a hole in the end of the tang block. With this tang block are formed the tangs 20, 21 and 22, the central tang 21 being of greater height or length than the endmost tangs 20 and 22 which will permit said tang 21 to engage certain objects, such as a barrel, that might not be engaged by either of the shorter tangs. When articles such as bags are being handled by the truck the tangs are reversed, as shown in Fig. 6, so that a flat surface is presented to prevent puncturing the bags or like objects.

As a further assistance in handling bags or other small objects I provide an adjustable nose 23 consisting of a foot plate 24 with rearwardly projecting legs 25 having their inner or rear ends pivoted to the insides of the handle bars as at 26 permitting the nose to be swung out into operative position as shown in full lines in Fig. 2 or be thrown back as shown in dotted lines in said figure. When the nose is in operative position the leg portions 25 rest upon the cross piece 4 while when in an inoperative position they rest upon the cross piece 5.

Of course I do not wish to be limited to the exact details of construction as herein shown as these may be varied within the limits of the appended claims without departing from the spirit of my invention.

Having thus fully described my invention, what I claim as new and useful is:—

1. As an article of manufacture for a hand truck, a toe piece including a housing, a tang block for reversible insertion in the housing and tangs on said block.

2. A hand truck including a pair of handle bars, toe pieces mounted on the forward ends of said handle bars, said toe pieces including housings, tang blocks removably and reversibly mounted in said housings and tangs formed with the tang blocks.

3. A hand truck including a pair of handle bars, toe pieces mounted on the forward ends of said handle bars, said toe pieces including housings, tang blocks removably and reversibly mounted in said housings and tangs of different heights formed integral with said tang blocks.

4. A hand truck including a pair of handle bars, toe pieces mounted on the forward ends of said handle bars, said toe pieces including housings, tang blocks removably and reversibly mounted in said housings, a plurality of tangs formed with the tang blocks, an intermediate tang being of greater height than the others and means to temporarily hold the tang blocks in the housings.

In testimony whereof, I have hereunto affixed my signature.

PETER C. FRITZ.